UNITED STATES PATENT OFFICE.

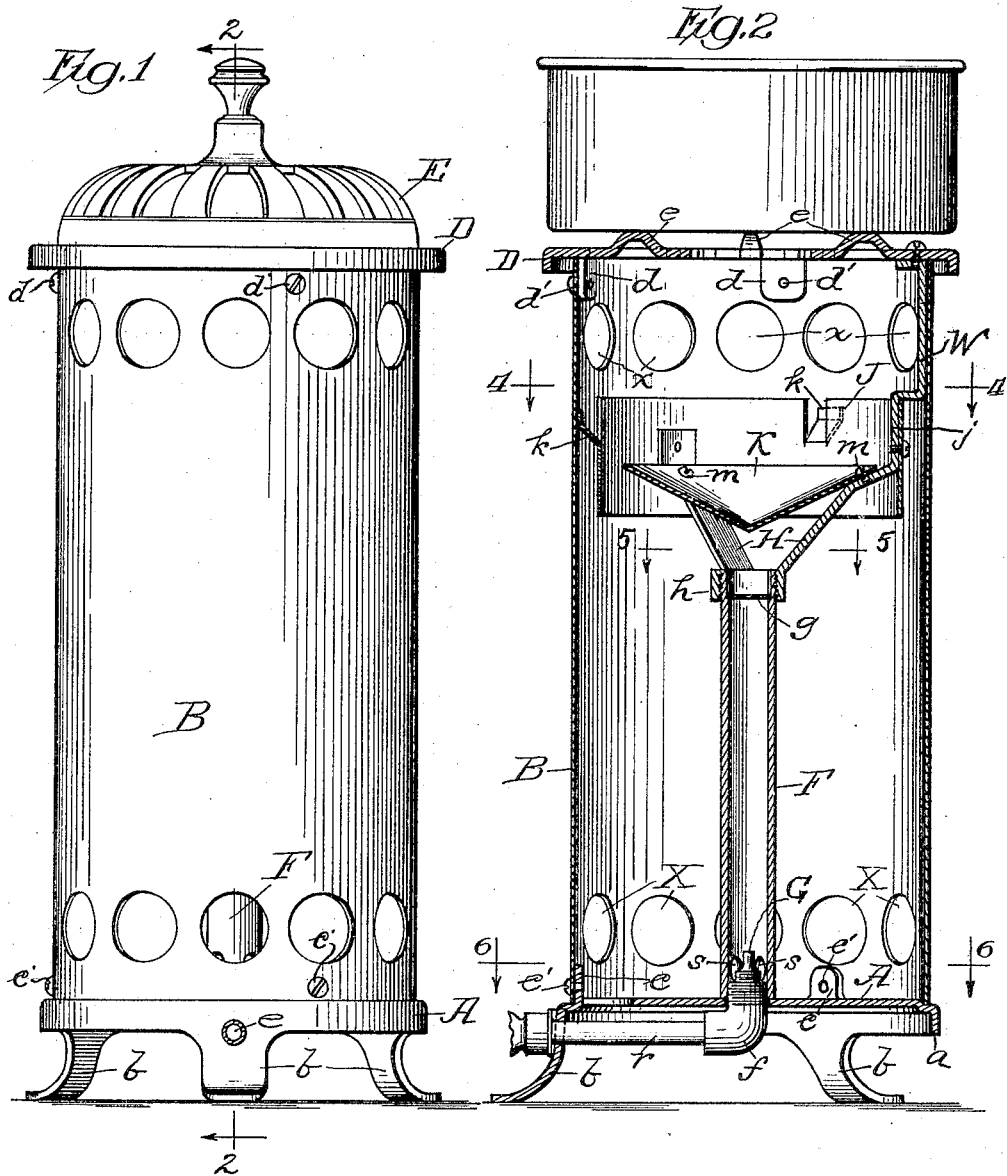

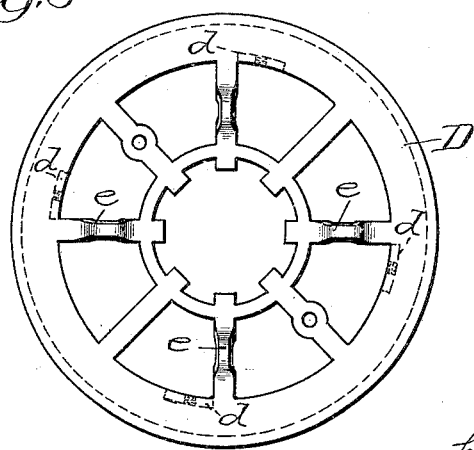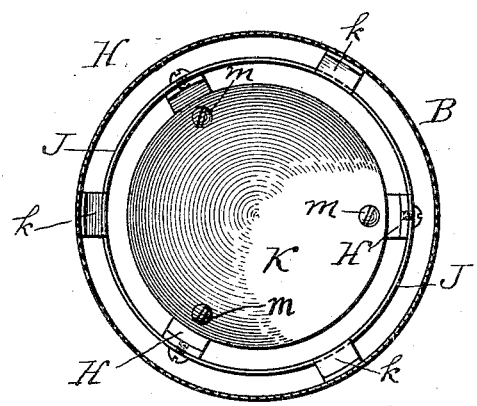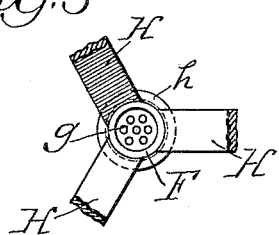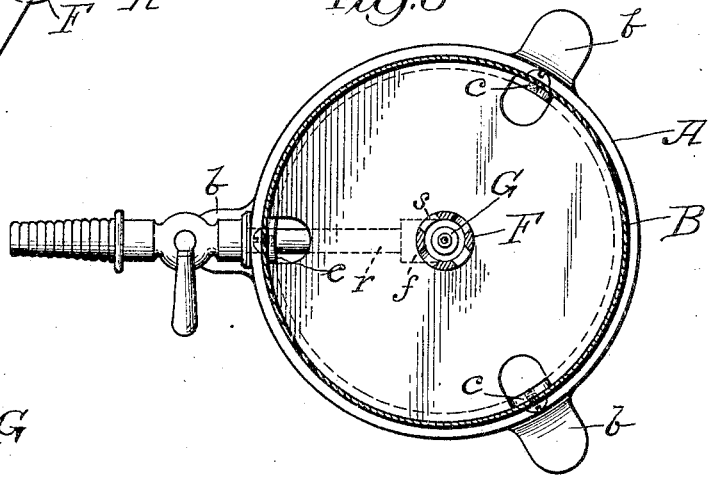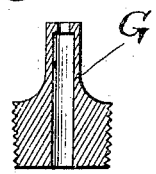

CHARLES A. KIRKWOOD, OF CHICAGO, ILLINOIS.

GAS-HEATER.

1,390,296.  Specification of Letters Patent.  Patented Sept. 13, 1921.

Application filed May 10, 1920. Serial No. 380,113.

*To all whom it may concern:*

Be it known that I, CHARLES A. KIRKWOOD, a citizen of the United States, residing at Chicago, in the county of Cook and State of Illinois, have invented new and useful Improvements in Gas-Heaters, of which the following is a full, clear, and exact description.

My invention relates to gas heaters and particularly those for domestic use. The object of my invention is to provide a simple and economic construction of the interior parts of the same so as to obtain a perfect circulation and heating of the air passing therethrough and the heating of the superstructure thereof with the least expenditure of fuel. And a further object is to facilitate the removal of the interior parts thereof from the casing and the assembling and disassembling of the heater easily and quickly.

This I accomplish by the means hereinafter fully described and as particularly pointed out in the claims.

In the drawings:

Figure 1 is a side view of my improved gas stove.

Fig. 2 is a vertical section thereof taken on dotted line 2, 2, Fig. 1, excepting that a boiler is substituted for the ornamental top shown in the latter figure.

Fig. 3 is a top view of the top-plate of said heater.

Fig. 4 is a horizontal section taken on dotted line 4, 4, Fig. 2.

Fig. 5 is a horizontal section taken on dotted line 5, 5, Fig. 2.

Fig. 6 is a horizontal section taken on dotted line 6, 6, Fig. 2.

Fig. 7 is a detail view showing a vertical section of the nozzle of said heater.

Referring to the drawings, A, represents a base made, preferably, of a circular metal plate the edge $a$ of which is rabbetted and flanged downward, and provided with, say, three equi-distant corresponding legs $b$. B represents a cylindrical shaped vertical casing the lower edge of which is seated on the rabbetted margin of the base-plate, and is secured concentric thereto by means of lugs $c$, that are cut and bent upwardly from said base-plate, and screws $c'$, tapped through said casing into the lugs.

The top of the casing is surmounted by a perforate top-plate D, whose diameter exceeds that of the casing and has its edge flanged downward so as to depend from the same, and it is provided with downwardly projecting equi-distant lugs $d$, that lap against the inner surface of the casing, to which latter they are secured by means of screws $d'$. This top-plate may be covered over by a more or less open ornate metal cover E, but this cover may be removed whenever desired, and a boiler or other utensil set on said top-plate which latter has upwardly curved humps, $e$, made intergal therewith that support said utensil above said plate and permit the circulation of the heated products of combustion around it.

The gaseous fuel for this heater is provided by a supply-pipe $r$, the outer end of which passes through the downwardly flanged edge of the base-plate, and the inner end of which has an elbow $f$ screwed thereon whose vertical portion extends through a central opening in said base-plate. Both the exterior and interior of the vertical portion of the elbow are screw-threaded. The exterior threads engage the inner screw-threaded end of a vertical tubular mixing-chamber F, and the screw-threaded body of a nozzle G is screwed into the upper end of said elbow and discharges into the lower end of the mixing-chamber.

The lower end of the mixing-chamber is provided with a series of perforations that surround the nozzle G and the upper end of said chamber extends to and terminates preferably, at a point slightly above the center of height of the casing.

Near its upper end the mixing-chamber has a mixing-plate $g$, inserted in the bore thereof, which may be perforated as shown in Fig. 5 of the drawings, or constructed in any other manner, and may be secured in place in any way desired.

The upper end of said chamber is exteriorly threaded and the boss $h$ of a spider is screwed thereon. This spider has several, say three, equi-distant integral arms H, projecting radially outward and upwardly therefrom, and their upper ends terminate in vertical portions $j$ that bear against the inner surface of and support an annulus or ring J, whose axis is above and in alinement with the axis of the mixing-chamber.

The annulus J is made of flat metal and is of a diameter less than that of the casing B from which it is spaced apart by means of equi-distant braces $k$, which latter are made by making parallel vertical slits in the annulus from its upper edge downward, and bending the metal strip between said slits outward until they come in contact with and press outward against the casing.

The arms H of the spider have their upper portions inclined at a more horizontally disposed angle than their lower portions and support an inverted cone-shaped spreader K, which is secured thereto, preferably, by screws *m*. The inverted apex of this spreader is in alinement with the axis of the mixing-chamber, and the rim thereof is of such diameter that it is separated from the annulus.

In operation the gas issues from the nozzle G under pressure and sucks or draws air into the mixing-chamber through perforations *s*. This current of gas and air is divided and thoroughly broken up and mixed by the mixing-plate *g* before it issues from the upper end of said chamber F and is ignited as it issues therefrom and the heated products of combustion so generated impinge against the underside of the spreader and ascend up between the rim of the spreader and annulus and are directed by the latter up to and through the top-plate.

The casing has a circumferential series of openings X at its lower end and a similar series *x* at its upper end, and the air circulation resulting therefrom greatly increases the volume of heated air generated by my improved burner.

I do not desire to be limited to the exact construction of the various elements of my improved gas burner as hereinbefore described. So long as they perform the same functions in the same relation, I desire to be considered as contemplating them as coming within the spirit of my invention.

It is obvious that instead of making the spider with its boss and arms, the spreader and the annulus in several separate pieces and securing the same together in the manner shown in the drawings they can be cast in one piece. For the larger sized heater embodying my improvements this might be desirable. I prefer in manufacturing my improved heater to extend the upper ends of the arms H to or slightly above the upper edge of the annulus and then outward until it comes in contact with the inner surface of the casing and then vertically to the top-plate where its upper end is bent inward and secured by rivets or screws to said top-plate and to the casing, substantially as shown in Fig. 2 of the drawings. This construction would avoid the necessity for the lugs *d* and the screws *d'* hereinbefore described and shown in said figure.

What I claim as new is:

1. In a gas-heater the combination with a base-plate, a casing having perforations near the top and bottom edge supported thereby, and a suitable perforate element fitted over the top of said casing, of a vertically disposed tubular mixing-chamber having perforations in its lower end portion, a nozzle discharging into said lower end, a mixing-plate in the bore of said chamber, a disked spreader supported above said mixing-chamber the center of which is in axial alinement with the axis of said chamber, and an annulus separated from said casing and said spreader and surrounding the latter to direct the combustion gases onto said perforate element.

2. In a gas heater, the combination with a casing having apertures near the bottom and top edge, a base-plate upon which said casing is supported and which has upwardly projecting lugs punched therefrom to which said casing is secured, and a perforate element fitted over the top of said casing, of a nozzle, a vertically disposed tubular mixing-chamber, a spider the boss of which is fitted upon the upper end of said chamber and has arms projecting upwardly and outwardly therefrom, a spreader supported by and secured to said arms centrally above said chamber, and an annulus surrounding the rim of said spreader and interposed between but separated from said casing and spreader to direct the combustion gases onto said perforate element.

3. In a gas heater, the combination with a casing having apertures near the top and bottom edge, a base-plate upon which said casing is supported and which has upwardly projecting lugs punched therefrom to which said casing is secured, and a perforate element fitted over the top of said casing, of a gas jet, a vertically disposed tubular mixing-chamber, a spider the boss of which is fitted upon the upper end of said chamber and has arms projecting upwardly and outwardly therefrom, an annulus secured to and supported by said arms concentric to but separated from said casing, and a disked spreader supported by said arms so that its rim is surrounded by said annulus but is spaced therefrom, said annulus directing the combustion gases onto said perforate element.

4. In a gas-heater the combination with a base-plate, a casing having apertures near the bottom and top edge supported thereby, and a suitable perforate element fitted over the top of said casing, of a vertically disposed tubular mixing-chamber having perforations in its lower end portion, a nozzle discharging into said lower end, a mixing-plate in the bore of said chamber, a disked spreader supported above said mixing-chamber the center of which is in axial alinement with the axis of said chamber, and an annulus separated from said casing and said spreader and surrounding the latter, and having braces made by providing the same with parallel slits and bending the resulting strips outward to contact with the casing, said annulus directing the combustion gases onto said perforate element.

5. In a gas heater the combination with a base-plate, a casing having apertures near the bottom and top edge supported thereby, and a perforate element fitted over the top of said casing, of a vertically disposed tubular mixing-chamber having perforations in its lower end portion, a nozzle discharging into the lower end thereof, an annulus above said chamber adapted to direct the combustion gases onto said perforate element, a spider having a central boss mounted upon said chamber and having upwardly and outwardly projecting arms, which support said annulus concentric with but separate from said casing, and a spreader supported by said arms and spaced apart from said annulus which surrounds the same; said annulus having integral lugs projecting therefrom that extend outward and bear against said casing.

In witness whereof I have hereunto set my hand and seal this 28th day of April, 1920.

CHARLES A. KIRKWOOD.

Witnesses:
    FRANK D. THOMASON,
    VIOLET WARDELL.